Figures 2, 3:
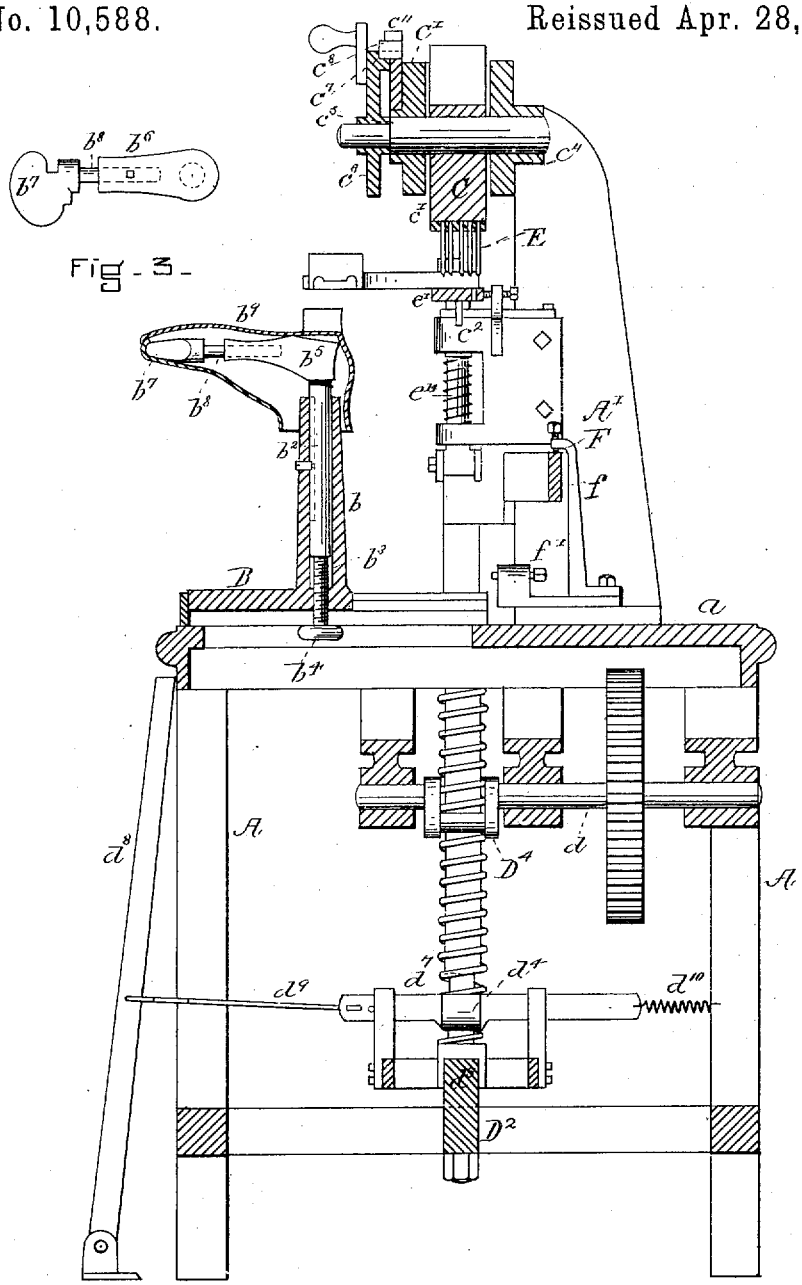

3 Sheets—Sheet 1.
H. A. HENDERSON.
Assignor, by mesne assignments, to THE NATIONAL HEELING MACHINE COMPANY.
HEEL NAILING MACHINE.
No. 10,588. Reissued Apr. 28, 1885.
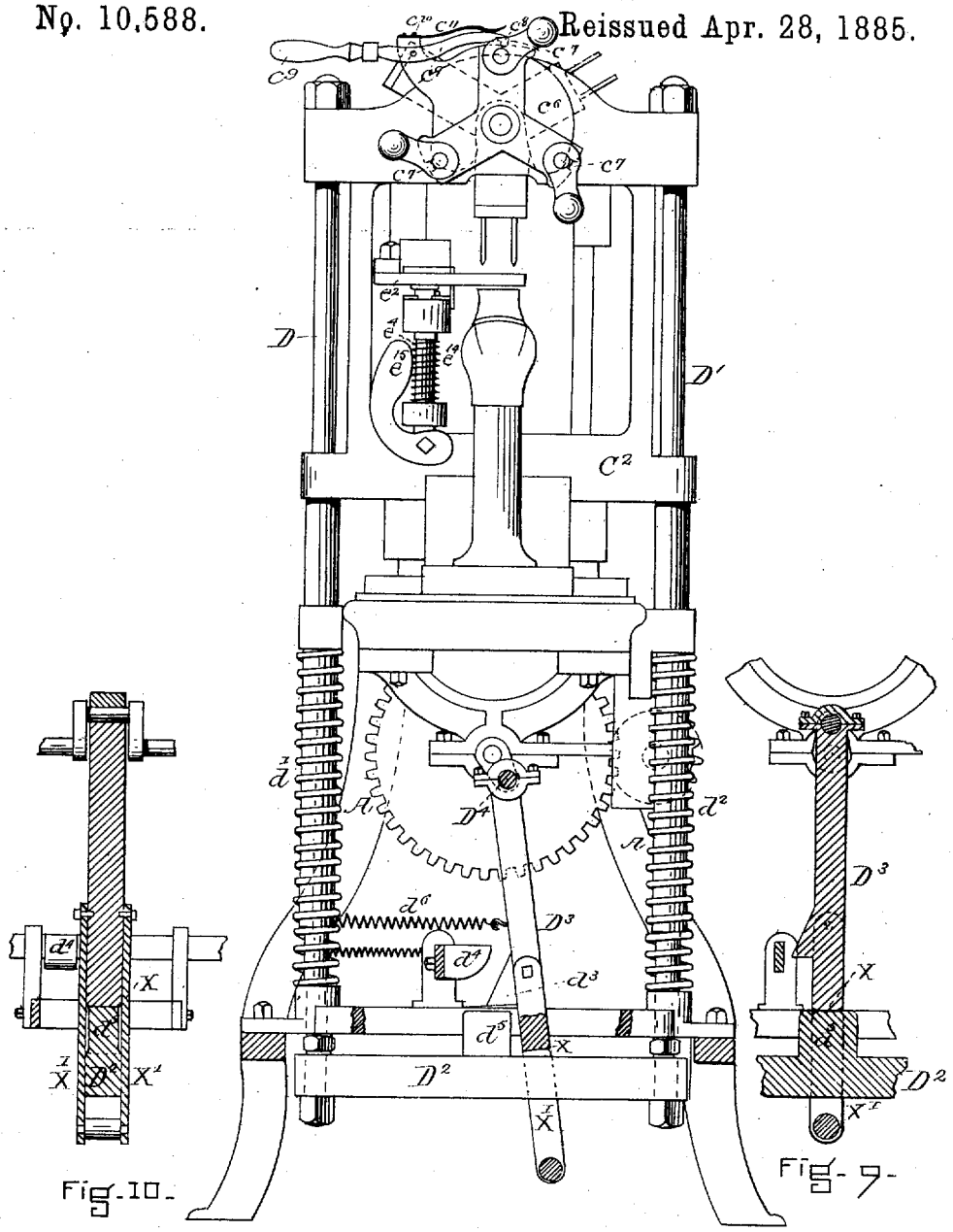
WITNESSES
Ted Harris
Fred. B. Dolan.
INVENTOR
Henry A. Henderson
by his attys
Clarke & Raymond
THE NORRIS PETERS CO., PHOTO-LITHO., WASHINGTON, D. C.

H. A. HENDERSON.

Assignor, by mesne assignments, to THE NATIONAL HEELING MACHINE COMPANY.

HEEL NAILING MACHINE.

No. 10,588. Reissued Apr. 28, 1885.

WITNESSES

Fred. Harris

Fred. B. Dolan.

INVENTOR

Henry A. Henderson by his attys

Clarke & Raymond.

THE NORRIS PETERS CO., PHOTO-LITHO., WASHINGTON, D. C.

H. A. HENDERSON. 3 Sheets—Sheet 3.
Assignor, by mesne assignments, to THE NATIONAL HEELING MACHINE COMPANY.
HEEL NAILING MACHINE.
No. 10,588. Reissued Apr. 28, 1885.
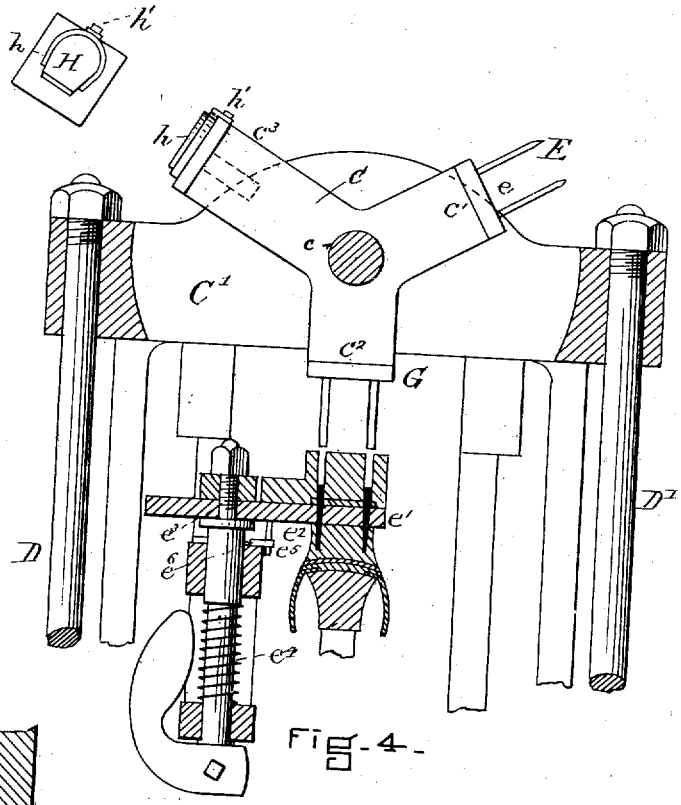
Fig-4-
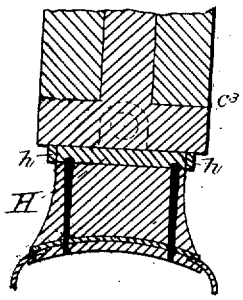
Fig-7-
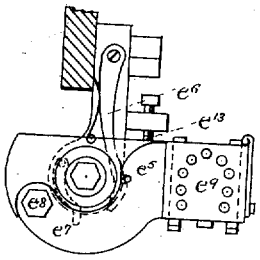
Fig-5-
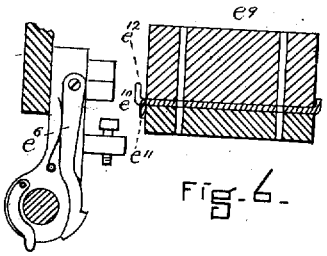
Fig-6-
Fig-8-
WITNESSES
Ed. Harris
Fred. P. Dolan.
INVENTOR
Henry A. Henderson
by his attys
Clarke & Raymond.
THE NORRIS PETERS CO., PHOTO-LITHO., WASHINGTON, D. C.

UNITED STATES PATENT OFFICE.

HENRY A. HENDERSON, OF LYNN, MASSACHUSETTS, ASSIGNOR, BY MESNE ASSIGNMENTS, TO THE NATIONAL HEELING MACHINE COMPANY, OF PORTLAND, MAINE.

HEEL-NAILING MACHINE.

SPECIFICATION forming part of Reissued Letters Patent No. 10,588, dated April 28, 1885.

Original No. 252,215, dated January 10, 1882. Application for reissue filed December 4, 1883.

*To all whom it may concern:*

Be it known that I, HENRY A. HENDERSON, of Lynn, in the county of Essex and State of Massachusetts, a citizen of the United States, have invented a certain new and useful Improvement in Heel-Nailing Machines, of which the following is a full, clear, and exact description, reference being had to the accompanying drawings, forming a part of this specification, in explaining its nature, in which—

Figure 1 is a front elevation of my machine. Fig. 2 is a vertical longitudinal section thereof. Fig. 3 is a detail view representing the construction of the last employed in connection with the jack. Fig. 4 is an enlarged view representing the upper part or that portion of the machine carrying the awls, drivers, &c. Figs. 5, 6, 7, 8, 9, and 10 are detail views hereinafter more fully specified.

The invention comprises a jack for holding and presenting the work to the nail-driving devices, an iron last of novel construction, used in connection with the jack, for supporting the work, and nail-driving devices consisting of a revolving head carrying two or three arms, as the case may be, one of which arms supports a gang or group of awls, the second a gang or group of drivers, and the third a device for holding the top lift of the heel. The revolving head is supported by a cross-head, which is lowered or depressed by means of a crank and suitable connecting mechanism, as hereinafter described, and raised by suitable springs.

It also consists in a novel arrangement for feeding the nails to a position under the drivers, which, together with the templet for the awls, is supported independently of the cross-head, but which is adapted to be moved therewith, as hereinafter specified.

It further consists in various details of construction, which will hereinafter be more fully specified.

A represents the lower portion of the frame of the machine, and A′ a bracket for supporting some of the upper working parts of the machine, which is bolted to the upper part or bed, $a$, of the part A.

B is a sliding carriage, which is adapted to be moved horizontally by power, automatically or by hand, in suitable ways in or on the bed-plate $a$, one of these ways being shown in Fig. 2.

No means for operating the carriage by power are shown, but any of the well-known constructions may be employed for this purpose.

The carriage supports the jack-standard $b$, which is a hollow post, and a rod or support, $b^2$, having at its lower end a screw-rod, $b^3$, and thumb-screw or wheel $b^4$ is arranged within the post to be moved vertically by said screw and wheel, and carries or supports at its upper end the metallic last form or support $b^5$, although it may be used to receive an ordinary iron or wooden last. The last or support $b^5$, shown and described, however, has one or two advantages over the ordinary metallic last, in that it can be used for rights and lefts, and can be adjusted to varying length-sizes. This I accomplish by making the lasts or supports in two parts, $b^6$ $b^7$, and connecting them by a spindle, $b^8$, which is fastened in a hole in the part $b^6$ by a set-screw, $b^9$, or any other suitable locking mechanism. The part $b^7$ is arranged to swivel or turn freely a half-revolution on the spindle $b^8$, and it is shaped in such a manner that when in the position shown in Fig. 3 it serves as a left last, and when turned a half it will serve as a right last.

By moving the spindle in or out in its hole of course the last or form may be shortened or lengthened, as desired.

Suitable stops may be arranged upon the spindle for preventing the part $b^7$ from falling or turning by gravity beyond the position which it should occupy.

The head C, carrying the nail-driving appliances, is pivoted at $c$ to the cross-head C′, (best shown in Fig. 4,) and has the awl-carrying arm $c^1$, the driver-rod carrying arm $c^2$, and the arm $c^3$, which supports the device for holding the lower lift of the heel, or, as I shall call it hereinafter, the "top lift," it being the last or upper lift applied to the heel when it is in its inverted position upon the last.

The head is keyed to the shaft $c^4$, and this shaft has suitable bearings, $c^5$, in the head C′, and at its front end there is secured a three-armed handle, $c^6$, (shown in Figs. 1 and 2,) whereby the head may be revolved.

Each arm of the handle is provided with a notch, $c^7$, into which the catch $c^8$ on the end of the lever $c^9$, pivoted at $c^{10}$ to a suitable bracket, is closed automatically by the spring $c^{11}$ when the head has been revolved sufficiently to bring the notch in line with the catch.

The head is reciprocated by means of the rods D D′, (shown in Figs. 1 and 4,) the cross-bar $D^2$, the loose connecting-rod $D^3$, the crank $D^4$ on the shaft $d$, and the springs $d'$ $d^2$, the crank and connecting devices serving to depress or draw down the cross-head against the stress of the springs $d'$ $d^2$, and the springs serving to automatically return the cross-head to its original place.

A loose connection of peculiar construction is provided between the connecting-rod $D^3$ and the cross-bar $D^2$, by which an automatic stop motion is provided. To understand this it must be borne in mind that the connecting-rod $D^3$ is not attached at its lower end to the cross-bar $D^2$, but is arranged to move or swing freely at its lower end, and that it communicates motion to the cross-bar $D^2$ only when it is permitted by the movement of the latch $d^4$, as it may be called to swing in over the top of the post or protection $d^5$, which extends upwardly from the cross-bar $D^2$ at its highest position, so that upon the continued revolution of the crank the connecting-rod forces the cross-bar and mechanism attached thereto downward.

It will be observed that the connecting-rod proper ends at the line X, and that the strap-plates X′, bolted to the rod, extend below this line and straddle the bar $D^2$; also, that the latch $d^4$ and projection $d^3$ on the connecting-rod prevent the rod from swinging over the post so long as the latch is in its normal position, but that upon the horizontal movement of the latch out of the path of the movement of the projection the rod swings or is drawn in by the spring $d^6$, when the crank is at its highest point, and then moves down upon the post engaged with it, and forces it and bar $D^2$ and connecting devices downwardly.

In Fig. 1 the connecting-rod is represented as disengaged from the post and at its lowest position. The latch $d^4$ is supported by a bar, $d^7$, which has a horizontal sliding movement in suitable ways at right angles to the line of revolution of the crank, and in Fig. 2 I represent a lever, $d^8$, connecting-rod $d^9$, and spring $d^{10}$ for giving this latch the proper movements in relation to the projection $d^3$. The latch is quite narrow, and when at rest acts, as above stated, as an obstruction in preventing the connecting-rod engaging with the upper part of the post $d^5$, holding the connecting-rod outwardly therefrom. When, however, it is desired to start the machine, the lever $d^8$ is drawn out and the latch moved from the path of the projection $d^3$, which, by the spring $d^6$, with the connecting-rod $D^3$, is drawn to a position over the block $d^5$. Then, by the continued revolution of the crank, the connecting-rod is given a downward movement, and of course moves the post and cross-bar $D^2$ down with it. Meanwhile, the handle $d^8$ being released, the latch $d^4$ is automatically drawn back to its original position by the spring $d^{10}$, so that during the upward movement of the projection $d^3$ its side surface comes in contact with the side surface of the latch, and the connecting-rod is thereby moved off the upper surface of the post to its original position, and kept off thereby until it is again desired to start the machine.

The shaft $d$ has suitable bearings in the frame of the machine, and is revolved in any desirable manner.

E represents the gang or group of awls. They are fastened to their supporting-block $e$ at the end of the arm $e'$ in any desirable way, and the block is fastened to the end of the arm in any suitable manner. In Fig. 2 they are represented in a position to be immediately driven. $e'$ represents the templet, which is provided with holes a trifle larger than the size of the awls and drivers. It is supported at the end of the plate $e^2$, which is pivoted at $e^3$ to the yielding post $e^4$.

The post, it will be observed, is arranged at the left hand of the machine, and the templet is swung or moved horizontally upon a vertical axis into position, and is located in that position by means of a pin, $e^5$, and latch $e^6$, adapted to close automatically over the pin by spring-pressure. The templet-plate $e^2$ also carries or supports a plate, $e^7$, which is pivoted thereto at $e^8$, and which carries at its end the nail-holder $e^9$. This nail-holder is adapted to be swung out from the templet-plate, as represented in Fig. 2, and its under surface is recessed to receive a sliding plate, $e^{10}$. This plate has a limited extent of movement, is provided with holes corresponding in number, position, and size to the holes in the templet and nail-holder, and has a downwardly-projecting flange, $e^{11}$, which, in the act of locating the nail-holder in position over the templet, comes in contact with the templet and holds the sliding plate while the nail-holder is being moved into position, there uncovering the holes in the nail-holder and causing the holes in the templet, sliding plate, and nail-holder to come in line, and consequently allow the nails to drop into the holes previously punctured in the heel.

Suitable grooves or guides on or in the under surface of the nail-holding block are arranged for receiving the sliding plate and need not further be described.

A projection, $e^{12}$, acts as a stop in preventing the plate from being withdrawn too far in moving it to close the holes in the nail-holder.

The templet and the nail-holder may be locked together by any suitable latching device.

An adjustable stop, $e^{13}$, fixes the extent of movement of the templet-plate in an inward direction.

As above stated, the templet-plate is provided with a yielding vertical movement. This is in opposition to the stress of the spring $e^{14}$, which surrounds the rod $e^4$, and it is moved downwardly by the downward movement of the cross-head, as hereinafter explained, and upwardly by the spring $e^{14}$ upon the upward movement of the cross-head.

The cam-lever $e^{15}$, fastened to the lower end of the post, may be used for the purpose of locking the templet-plate in its lowest position, if desired.

A stop, F, in connection with the adjustable bar $f$, forming a part of the cross-head frame, controls the extent of the upward movement of the cross-head, and the adjustable stop $f'$ limits the extent of the inward movement of the carriage B. The cross-head C′ has a frame, $C^2$, extending downwardly and backwardly therefrom, adapted to slide upon a portion of the bracket A′, whereby the movement of the cross-head is steadied.

In operation the awls and the templet are brought to the position shown in Fig. 2, and the jack-carriage is moved to bring the heel under the templet-plate, as shown in Fig. 1. The lever $d^8$ is then drawn out, and the machine makes one revolution and stops, driving the awls through the holes in the templet-plate into the heel and withdrawing them therefrom. The operator then revolves the head a third of a revolution, bringing the drivers in position over the heel, substantially as shown in Fig. 4, and the nail-holder, which has been previously filled with nails, is moved into position over the templet, and the nails automatically discharged therefrom into the templet and holes formed in the heel. This stage of the operation is represented in Fig. 4. The lever $d^8$ is then again drawn out, the machine goes through one revolution, the drivers descend through the holes in the nail-holder and templet, driving the nails into the heel and soles, and clinching their ends upon the metal support. At the same time, by the contact of the driver-holder G and the upper surface of the nail-holder, the heel is compressed as much as may be desired, the nail-holder and templet moving or yielding downwardly with the downward movement of the cross-head and drivers. The operator then revolves the head, and if a top-piece is to be "spanked" on he moves the arm $c^3$ into the position before occupied by the awls and drivers, removes the templet and nail-holder from over the heel, and the lift H, having been previously inserted in the spring-holder $h$, which is a spring-arm curved to embrace the side of the lift and fastened at $h'$ to the arm $c^3$, the lever $d^8$ is again drawn out, the machine makes another revolution, and the top piece, H, is spanked onto the remainder of the heel.

Of course I may use a head having the two arms $c'$ $c^2$ without the head $c^3$, if I desire, and in lieu of lifting the cross-head by spring pressure I may use a positive motion, without departing from the spirit of this invention.

Having thus fully described my invention, I claim and desire to secure by Letters Patent of the United States—

1. In an organized heel-nailing machine, the combination of a jack for holding the boot or shoe, adapted to be moved horizontally, a group or gang of awls and a group or gang of drivers carried by a cross-head adapted to be vertically reciprocated, and means, substantially as specified, for interchanging the position of the groups on the head, all substantially as and for the purposes described.

2. In an organized heel-nailing machine, the combination of a jack for holding the work, adapted to have a horizontal movement imparted to it, a templet adapted to be moved horizontally into a position over the heel, and a gang or group of awls adapted to be reciprocated by the same mechanism that reciprocates the drivers, all substantially as and for the purposes described.

3. In an organized heel-nailing machine, the combination of a jack for the boot or shoe, means for imparting to it a horizontal movement, a templet adapted to be moved horizontally into position, a nail-holder adapted to be moved horizontally into position independently of the templet, a gang or group of awls and a gang or group of drivers interchangeably secured to a cross-head, and means for reciprocating said cross-head, all substantially as and for the purposes described.

4. In an organized heel-nailing machine, the combination of a jack for the boot or shoe, the means for imparting to it a horizontal movement, a templet and nail-holder adapted to be brought into position by a horizontal movement, and also adapted to have a vertical movement imparted to them, a gang or group of awls and a gang or group of drivers fastened to the head and adapted to be moved in relation to the templet and nail-holder, as specified, and means for imparting to them and the head vertical reciprocating movements, all substantially as specified.

5. In an organized heel-nailing machine, the combination of a jack for the work, means for moving it horizontally, a templet and nail-holder adapted to have horizontal movements, as specified, a group of awls, a group of drivers, and a lift-holder adapted to be successively brought into position over the heel of the boot or shoe, and to be reciprocated by the same operative mechanism, all substantially as described, and for the purposes specified.

6. In an organized heel-nailing machine, a templet-plate adapted to have a horizontal movement imparted to it, and a nail-holder having a horizontal movement independent of the templet-plate, all substantially as and for the purposes described.

7. In a heel-nailing machine, the head C, provided with the awl-supporting arm $c'$ and driver-supporting arm $c^2$, the awls and the drivers, and means for revolving the same upon a horizontal axis, whereby the awls and drivers may be successively brought into position, all substantially as described.

8. The combination of the cross-head C′, supporting the revolving awl and driver head C, and means for reciprocating them, consisting of the rods D D′, the crank $D^4$, the connecting-rod $D^3$, the cross-bar $D^2$, and the springs $d'$ $d^2$, all substantially as and for the purposes described.

9. The combination, in an organized heel-nailing machine, of the head C′, the head C, supporting the drivers and top-lift holder, means for revolving the head to successively bring in position the awls, driver, and holder, and for reciprocating the same, and an automatic stop motion adapted to automatically stop the machine at the end of each revolution, substantially as and for the purposes described.

10. The form or support $b^5$, consisting of the fixed part $b^6$ and the toe part $b^7$, adapted to be revolved in relation to the fixed part, whereby the support may be used both for right and left shoes, all substantially as set forth.

11. In a heel-nailing machine, the combination of the templet with the adjustable stop $e^{13}$, all substantially as described.

12. The combination of a sliding jack for supporting the heel of a boot or shoe with a templet-plate pivoted, substantially as described, to be swung on an arc of a circle into and out of operative position over the jack.

13. The combination, in an organized heel-nailing machine, of the head C′, the drivers and top-lift-attaching device, and means for successively bringing them into operative position, and for reciprocating the head, and an automatic stop motion adapted to automatically stop the machine at the end of each revolution, substantially as and for the purposes described.

14. The combination of the cross-head C′, carrying the awls, drivers, and top-lift-attaching device, or either of them, with the rods D D′ and springs $d'$ $d^2$, for supporting the cross-head in its highest position, all substantially as and for the purposes described.

15. In a heel-nailing machine, a reciprocating cross-head having arms provided, respectively, with a gang of awls, a gang of drivers, and a top-lift-attaching device, substantially as described.

16. In a heeling machine, a reciprocating cross-head having a gang of awls, a gang of drivers, and the arm $e^3$, substantially as described.

17. In a heel-nailing machine, a reciprocating arm provided with an automatic top-lift holding and centering device, substantially as described, to grasp and hold the top lift by its edge.

18. The combination of the reciprocating cross-head having a block adapted to be brought in contact with the templet-plate to force it down upon the heel-blank, said templet, and a spring for returning it to its original position.

19. The combination of the templet $e'$, the rod $e^4$, and the lever $e^{15}$, all substantially as described.

20. In a heel-nailing machine, the combination of the pivoted templet-plate $e^2$, carrying the templet $e'$, with the stop $e^{13}$, substantially as described.

21. In a heel-nailing machine, the combination of the pivoted templet-plate $e^2$, carrying the templet $e'$, with the latch $e^6$, all substantially as described.

22. In a heel-nailing machine, the combination of a support for the boot or shoe, and a templet movable vertically and horizontally in relation to the said support to hold the heel-blank compressed while it is being nailed, and to expose it to the action of the top-lift-attaching device, with a reciprocating cross-head carrying a gang of awls, a gang of drivers, and a top-lift-attaching device, all substantially as described.

Executed at Boston, Massachusetts, November 10, 1883.

HENRY A. HENDERSON.

Witnesses:
F. F. RAYMOND, 2d,
FRED. HARRIS.